(12) United States Patent
Brennenstuhl et al.

(10) Patent No.: US 10,183,392 B2
(45) Date of Patent: Jan. 22, 2019

(54) HAND-HELD POWER TOOL WHICH INCLUDES A SHIFTABLE TRANSMISSION

(71) Applicant: Robert Bosch GmbH, Stuttgart (DE)

(72) Inventors: Jens Brennenstuhl, Albershausen (DE); Heiko Roehm, Stuttgart (DE); Andreas Heber, Bissingen an der Teck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 460 days.

(21) Appl. No.: 14/895,419

(22) PCT Filed: Jun. 3, 2014

(86) PCT No.: PCT/EP2014/061422
§ 371 (c)(1),
(2) Date: Dec. 2, 2015

(87) PCT Pub. No.: WO2014/195278
PCT Pub. Date: Dec. 11, 2014

(65) Prior Publication Data
US 2016/0102762 A1    Apr. 14, 2016

(30) Foreign Application Priority Data

Jun. 3, 2013 (DE) .......................... 10 2013 210 222
Jun. 2, 2014 (DE) .......................... 10 2014 210 343

(51) Int. Cl.
*B25F 5/00* (2006.01)
*B25B 21/00* (2006.01)
(Continued)

(52) U.S. Cl.
CPC .............. *B25F 5/001* (2013.01); *B25B 21/00* (2013.01); *B25B 21/008* (2013.01); *F16H 3/48* (2013.01);
(Continued)

(58) Field of Classification Search
CPC . B25F 5/001; F16H 3/54; F16H 63/20; F16H 63/42; F16H 3/48; F16H 63/08;
(Continued)

(56) References Cited

U.S. PATENT DOCUMENTS 5,897,454 A * 4/1999 Cannaliato .......... F16H 61/0293
475/263
6,758,783 B1 * 7/2004 Chen .................... B25B 21/008
475/266
(Continued)

FOREIGN PATENT DOCUMENTS

CN       101745899 A       6/2010
DE    10 2008 042033       3/2010
(Continued)

OTHER PUBLICATIONS

International Search Report for PCT/EP2014/061422, dated Jul. 15, 2014.

*Primary Examiner* — David J Hlavka
(74) *Attorney, Agent, or Firm* — Norton Rose Fulbright US LLP; Gerard Messina

(57) ABSTRACT

A hand-held power tool includes: a shiftable transmission for driving a drive shaft, which transmission is situated in a gear housing and is shiftable at least between a first gear and a second gear via a shifting member; and a pivotably supported actuating element, which is configured as a bistable spring element and situated, at least in sections, in the area between the shifting member and the gear housing, is associated with the shifting member. The bistable spring element is actuatable for the gear shifting, and assumes a stable shift position in at least one shift position of the shifting member associated with the first or second gear, and assumes an unstable position in an intermediate position of the shifting member which is situated between shift posi- (Continued)

tions of the shifting member associated with the first and second gears.

19 Claims, 12 Drawing Sheets

(51) Int. Cl.

| | | |
|---|---|---|
| *F16H 3/48* | (2006.01) | |
| *F16H 59/04* | (2006.01) | |
| *F16H 63/04* | (2006.01) | |
| *F16H 63/08* | (2006.01) | |
| *F16H 3/54* | (2006.01) | |
| *F16H 63/20* | (2006.01) | |
| *F16H 63/42* | (2006.01) | |

(52) U.S. Cl.
CPC ............. *F16H 3/54* (2013.01); *F16H 59/041* (2013.01); *F16H 63/04* (2013.01); *F16H 63/08* (2013.01); *F16H 63/20* (2013.01); *F16H 63/42* (2013.01); *F16H 2200/0034* (2013.01); *F16H 2200/2005* (2013.01)

(58) Field of Classification Search
CPC ................... F16H 63/04; F16H 59/041; F16H 2200/0034; F16H 2200/2005; B25B 21/008; B25B 21/00
See application file for complete search history.

(56) References Cited

U.S. PATENT DOCUMENTS

| | | | |
|---|---|---|---|
| 2009/0126958 A1* | 5/2009 | Trautner | B25D 16/006 |
| | | | 173/48 |
| 2011/0079408 A1 | 4/2011 | Grunwald et al. | |
| 2013/0065727 A1* | 3/2013 | Saur | B25F 5/001 |
| | | | 475/298 |

FOREIGN PATENT DOCUMENTS

| | | |
|---|---|---|
| DE | 10 2009 060929 | 6/2011 |
| DE | 202012006418 U1 | 8/2012 |
| EP | 2 206 572 | 7/2010 |
| WO | WO 2011/085871 | 7/2011 |

* cited by examiner

HAND-HELD POWER TOOL WHICH INCLUDES A SHIFTABLE TRANSMISSION

BACKGROUND OF THE INVENTION

1. Field of the Invention

The present invention relates to a hand-held power tool which includes a shiftable transmission for driving a drive shaft, which is situated in a gear housing and is shiftable at least between a first gear and a second gear via a shifting member.

2. Description of the Related Art

These types of hand-held power tools are known from the related art, and include a shiftable transmission for driving a drive shaft, the transmission being designed in the manner of a reduction gear unit, via which a predefined motor speed may be reduced to a speed range of the drive shaft which is necessary for a particular application. For example, in cordless screwdrivers, cordless screw drills, and/or cordless percussion drills, motor speeds of approximately 20,000 rpm are reduced to a speed range of approximately 150 rpm to 2,000 rpm.

The reduction gear units are designed, for example, as multistage planetary gears which include at least two gears, so that a user of this type of hand-held power tool may shift it between a first gear and a second gear, for example, the first gear being a comparatively slow gear having high torque, and the second gear being a comparatively fast gear having low torque. For implementing the gears, such a planetary gear customarily includes three planetary stages; for shifting gears, in each case at least one of the three stages is deactivatable via a shifting annulus gear which is displaceable via a manually actuatable actuating element. A spring wire which is actuatable via an associated sliding element and connected to the displaceable shifting annulus gear is used as the actuating element. This spring wire may either be pivoted via a fixed point or shifted linearly.

A disadvantage of the related art is that a sliding element is comparatively difficult to operate, in particular when a user in question is wearing work gloves, which therefore makes handling inconvenient. In addition, when the sliding element is improperly or insufficiently moved, the shifting annulus gear may be moved into an intermediate position, which during operation of the hand-held power tool may result in damage to the planetary gear.

BRIEF SUMMARY OF THE INVENTION

The object of the present invention, therefore, is to provide a novel hand-held power tool which includes a transmission that is shiftable at least between a first gear and second gear, in which smooth, convenient, and secure gear shifting between the individual gears is possible.

This object is achieved by a hand-held power tool which includes a shiftable transmission, for driving a drive shaft, which is situated in a gear housing and which via a shifting member is shiftable at least between a first gear and a second gear, the shifting member being coupled to a spring element, which for the gear shifting is indirectly or directly actuatable at least via a first and a second shifting element. An actuating element which is pivotably supported in the gear housing is associated with the shifting member, the actuating element being designed as a bistable spring element and situated, at least in sections, in the area between the shifting member and the gear housing. The bistable spring element is actuatable for the gear shifting, and assumes a stable shift position in at least one shift position of the shifting member associated with the first or second gear, and assumes an unstable position in an intermediate position of the shifting member which is situated between the shift positions of the shifting member associated with the first and second gears.

The present invention thus allows the provision of a hand-held power tool in which simple, smooth, and convenient gear shifting between the first and second gears is made possible by using a bistable spring element as the actuating element. The bistable spring element ensures that a shifting operation in question is completely and correctly carried out in each case with reduced shifting force, so that secure, reliable gear shifting is made possible, a particular shift position of the bistable spring element being coupled to an associated shift position of the shifting member. In addition, a compact, shortened design of the hand-held power tool with short tolerance chains may be made possible by situating the bistable spring element in the area between the shifting member and the gear housing; the number and size of necessary openings on the gear housing may be at least reduced, and an at least largely grease-resistant gear housing may thus be provided. In particular, by the use of the bistable spring element, predefined shift positions of the shifting member may be defined, and corresponding gear shiftings may be speeded up and thus temporally shortened.

According to one specific embodiment, the bistable spring element includes a ring-shaped base body situated in the area between the shifting member and the gear housing.

It is thus possible to provide a robust and stable bistable spring element.

The bistable spring element preferably includes at least two radially inwardly directed cam latches which are coupled to the shifting member and which are designed for moving the shifting member into a shift position associated in each case with the first or second gear, when the bistable spring element for the gear shifting is actuated.

Secure, reliable entrainment or displacement of the shifting member by the bistable spring element during gear shifting may thus be ensured.

According to one specific embodiment, the bistable spring element includes at least two radially outwardly directed control latches which are designed for allowing an actuation of the bistable spring element for the gear shifting via at least a first or a second shifting element. In one alternative specific embodiment, the bistable spring element includes at least four radially outwardly directed control latches which are designed for allowing an actuation of the bistable spring element for the gear shifting via at least a first or a second shifting element.

The present invention thus allows the provision of a hand-held power tool which easily allows use of more than one shifting element for the gear shifting. A suitable shifting element for the gear shifting may thus be provided, for example for each hand of a user of the hand-held power tool, in order to make convenient, user-friendly gear shifting possible for the user. In addition, predefined shift positions for the shifting elements may be defined by the use of the bistable spring element.

The first shifting element is preferably provided for creating an acceleration function, and the second shifting element is preferably provided for creating a gear shifting function.

Different operating switches may thus be used on the hand-held power tool for the gear shifting.

In one alternative embodiment, the bistable spring element includes at least one radially outwardly directed control latch which is designed for allowing an actuation of the bistable spring element for the gear shifting via at least one shifting element, the shifting element being designed as a gear shift selector element. In another alternative embodiment, the bistable spring element includes at least two radially outwardly directed control latches which are designed for allowing an actuation of the bistable spring element for the gear shifting via at least one shifting element, the shifting element being designed as a gear shift selector element.

In one alternative specific embodiment, the bistable spring element includes at least one radially outwardly directed control latch which is designed for allowing an actuation of the bistable spring element for the gear shifting via at least one shifting element, the shifting element being designed as a hand switch.

Alternatively, the bistable spring element may also include at least two radially outwardly directed control latches which are designed for allowing an actuation of the bistable spring element for the gear shifting via at least one shifting element, the shifting element being designed as a hand switch.

According to one specific embodiment, the bistable spring element is pivotably supported in the gear housing on at least two body edges.

The present invention thus allows the provision of a hand-held power tool in which a bistable spring element for the gear shifting may be situated in the hand-held power tool in a space-saving manner. In addition, synchronization of the components used for the gear shifting may easily take place without components specifically provided for this purpose.

The at least two body edges are preferably designed as radial extensions on the ring-shaped base body of the bistable spring element.

An uncomplicated and operationally reliable bistable spring element may thus be provided.

A bearing element designed in the manner of a bearing plate for pivotably supporting the bistable spring element is preferably situated in the gear housing.

A stable, reliable bearing of the bistable spring element in the gear housing may thus be made possible.

At least two axial bearing arms for pivotably supporting the bistable spring element are preferably formed on the bearing element.

A simple, cost-efficient bearing element for pivotably supporting the bistable spring element may thus be provided.

According to one specific embodiment, the shiftable transmission is designed in the manner of a planetary gear which includes at least one planetary stage, the shifting member being designed in the manner of a shifting annulus gear. The planetary gear may also be designed with two, three, or more planetary stages.

A robust and operationally reliable transmission may thus be used in an implementation of the hand-held power tool.

DETAILED DESCRIPTION OF THE INVENTION

Figure 1:
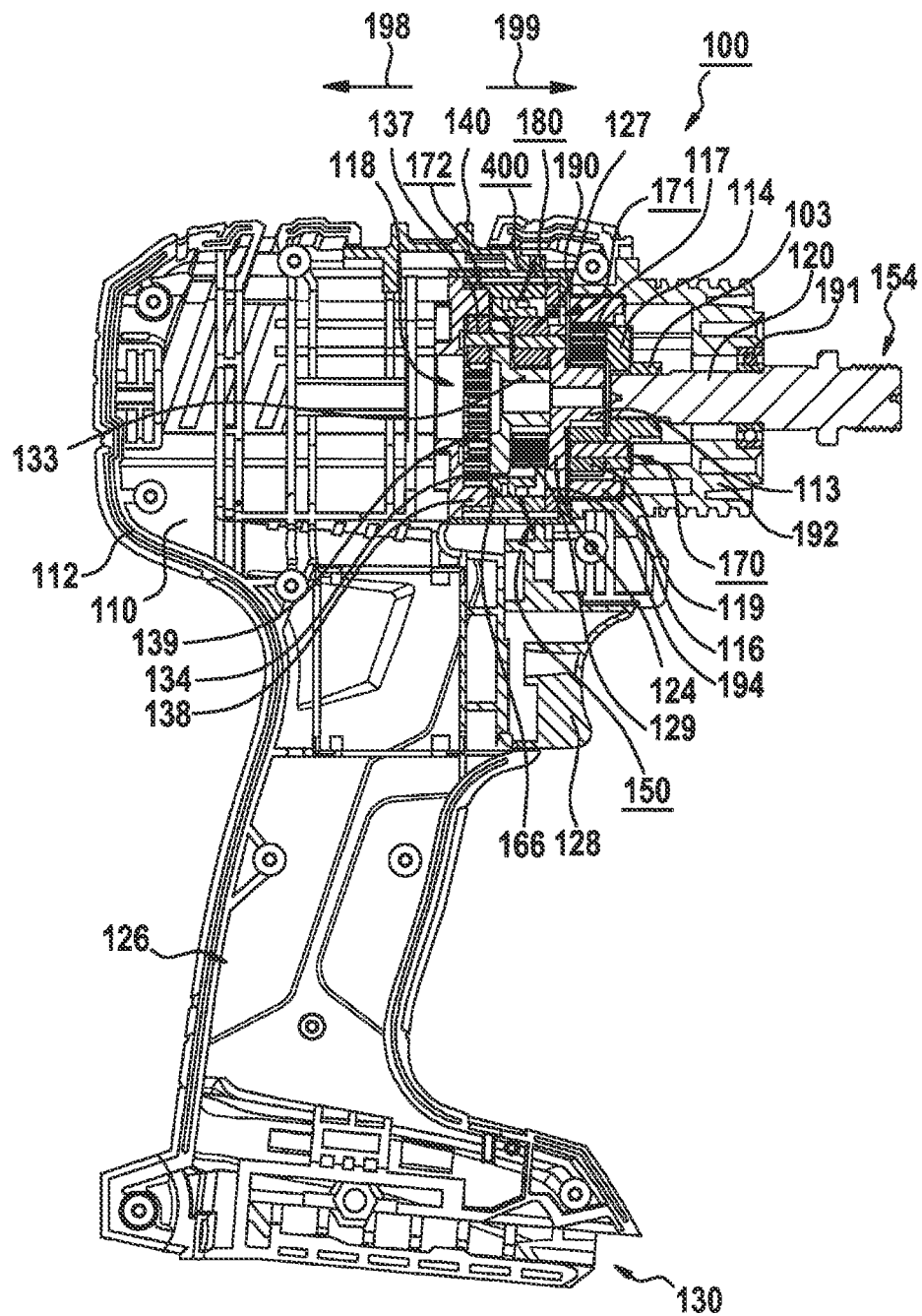
FIG. 1 shows a partially sectional, perspective view of a hand-held power tool which includes a bistable spring element for the gear shifting, according to one specific embodiment.

FIG. 1 shows an example of a hand-held power tool 100 which is operable at least in a first gear and a second gear, and which includes a tool housing 110 with a handle 126. As an example, tool housing 110 has a two-part design with housing shells which are fastened together, of which only one housing shell 112, at the rear in FIG. 1, is shown here.

Hand-held power tool 100 is preferably mechanically and electrically connectable to a rechargeable battery pack for supplying power at an interface 130, independently of the power grid. In FIG. 1, hand-held power tool 100 is designed as a cordless screwdriver as an example. However, it is pointed out that the present invention is not limited to a cordless screwdriver, and instead may be used for different hand-held power tools which are operable at least in a first gear and a second gear, regardless of whether the hand-held power tool is operable dependent on the power grid or independently of the power grid with a rechargeable battery pack, for example for a screw drill or cordless screw drill, a percussion screwdriver or cordless percussion screwdriver, a percussion drill or cordless percussion drill, and so forth.

According to one specific embodiment, a shiftable transmission 118 for driving a drive shaft 120, for example a drive spindle, is situated in tool housing 110, the drive shaft being rotationally movably supported on tool housing 110 via at least one roller bearing 191. As illustrated, shiftable transmission 118 is situated in a gear housing 190, which in turn is situated in tool housing 110. Transmission 118 is driven by an associated drive motor which is actuatable, i.e., switchable on and off, via a hand switch 128, for example, and which may be any type of motor, for example an electronically commutated motor or a direct current motor, the drive motor preferably being electronically controllable or regulatable in such a way that a change in rotational direction as well as specification of a desired rotational speed are achievable. The mode of operation and the design of a suitable drive motor are well known from the related art, so that an illustration of the drive motor is dispensed with in FIG. 1 for the purpose of simplicity of the drawing, and a detailed description of the drive motor is dispensed with here for the purpose of brevity of the description.

A tool receptacle, which may include a bit holder or a chuck, for example, which is fastenable to a fastening interface 154 of drive shaft 120, is associated with shiftable transmission 118. In addition, an optional torque clutch may be associated with shiftable transmission 118. However, it is pointed out that the mode of operation and the design of a suitable tool receptacle and of a suitable torque clutch are well known from the related art, so that their illustration is dispensed with in FIG. 1 for the purpose of simplicity of the drawing, and a detailed description thereof is likewise dispensed with here for the purpose of brevity of the description.

Shiftable transmission 118 is preferably shiftable at least between a first gear and a second gear via a shifting member 166. The first gear is, for example, a comparatively slow gear having high torque, and the second gear is a comparatively fast gear having low torque. For this purpose, an actuating element 150 which is pivotably supported in gear housing 190 is associated with shifting member 166, according to one specific embodiment the actuating element being designed as a bistable spring element 400 and situated, at least in sections, in the area between shifting member 166 and gear housing 190.

Bistable spring element 400 is actuatable at least for the gear shifting, and preferably assumes a stable shift position in at least one shift position of shifting member 166 associated with the first or second gear. Bistable spring element 400 assumes a stable shift position in particular in both shift positions of shifting member 166 associated with the first or second gear. Bistable spring element 400 preferably assumes an unstable position in an intermediate position of shifting member 166, i.e., in a position between those shift positions of shifting member 166 which are associated with first and second gears.

Bistable spring element 400 is preferably designed for the gear shifting of shiftable transmission 118 via at least one shifting element, and in the illustration, two shifting elements 128, 140. Accordingly, bistable spring element 400 may be designed for the gear shifting of shiftable transmission 118 via first shifting element 128 or via second shifting element 140, or via first shifting element 128 and second shifting element 140. First shifting element 128 is, for example, hand switch 128 of hand-held power tool 100, which is preferably designed for switching hand-held power tool 100 on and off and also for implementing an acceleration function. Hand switch 128 is in particular an on/off switch and/or an acceleration switch. As an example, second shifting element 140 is supported on tool housing 110 in the manner of a separate slide switch, and is designed at least for implementing a gear shifting function. At least slide switch 140 may optionally be lockable on tool housing 110 in associated shift positions.

According to one specific embodiment, shiftable transmission 118 is designed in the manner of a reduction gear unit which includes at least one shiftable gear stage. As illustrated, shiftable transmission 118 is designed in the manner of a planetary gear which includes three planetary stages situated in gear housing 190: a front stage 170, a middle stage 171, and a rear stage 172. For this reason, shiftable transmission 118 is also referred to below as "planetary gear" 118 for simplification of the description.

Front planetary stage 170 is preferably fixed in a front housing section 192 of gear housing 190 via a retaining plate 194, and as an example includes a sun wheel 113, at least one first and one second planet wheel 117 and 119, a planet carrier 114, and annulus gear 116, which is situated in gear housing 190 in an axially immovable and rotatably fixed manner in the drilling position. Planet carrier 114 is connected to a drive member 103 of drive shaft 120, which together with drive shaft 120 establishes at least a form-fit connection, for example; drive member 103 may be suitably fastened to planet carrier 114 or may be integrally molded onto same or formed in one piece with same.

Middle planetary stage 171 includes, as an example, a sun wheel 133, at least one first planet wheel and one second planet wheel 127 and 129, a planet carrier 124, and shifting member 166, which according to one specific embodiment is designed in the manner of a one-piece shifting annulus gear and is also referred to below as "shifting annulus gear." Alternatively, the shifting member may have a two-piece or two-part design, and may include, for example, an axially immovable inner annulus gear and an axially movable outer shift sleeve. Planet carrier 124 forms sun wheel 113 of front planetary stage 170; sun wheel 113 may be suitably fastened to planet carrier 124, or may be integrally molded onto same or formed in one piece with same. As illustrated, planet carrier 124 is situated, at least in sections, within a bearing element 180 which is designed in the manner of a bearing plate, and situated in gear housing 190 in a rotatably fixed manner. Bistable spring element 400 is pivotably supported on this bearing element 180, as described below for FIGS. 2 and 5.

Rear planetary stage 172 includes, as an example, at least one first planet wheel and one second planet wheel 137 and 139, a planet carrier 134, and an annulus gear 138 which is situated in gear housing 190 in an axially immovable and rotatably fixed manner. During operation of hand-held power tool 100, planet wheels 137, 139 are driven by a sun wheel, not shown for the purpose of simplifying the drawing, which is formed, for example, by a pinion associated with the drive motor. Planet carrier 134 forms sun wheel 133 of middle planetary stage 171; sun wheel 133 may be suitably fastened to planet carrier 134 or may be integrally molded onto same or formed in one piece with same.

During operation of hand-held power tool 100, shifting annulus gear 166 is displaceable in the axial direction of gear housing 190 from a first shift position, shown in FIG. 1, in the direction of an arrow 199 into a second shift position, not shown, by actuating bistable spring element 400 with the aid of first or second shifting element 128, 140. In this regard, the first shift position (at the rear in FIG. 1) is associated, for example, with the second, comparatively fast gear of planetary gear 118 having low torque, and the second shift position is associated, for example, with the first, comparatively slow gear of planetary gear 118 having high torque. By a reversed displacement of shifting annulus gear 166 from its second, front shift position into its first, rear shift position, as indicated by an arrow 198, planetary gear 118 may then be shifted back from the first gear into the second gear.

In its first, rear shift position, shifting annulus gear 166 is connected to planet carrier 134 of rear planetary stage 172 in a rotatably fixed manner, so that this planet carrier 134 and planet wheels 127, 129 of middle planetary stage 171 are likewise connected to one another in a rotatably fixed manner. Middle planetary stage 171 is thus deactivated, so that the second gear is activated. In its second shift position, which corresponds to an axial front position of shifting annulus gear 166 in FIG. 1, the shifting annulus gear is connected to bearing element 180 and thus to gear housing 190 in a rotatably fixed manner, so that middle planetary stage 171 and thus the first gear are activated.

Figure 2:
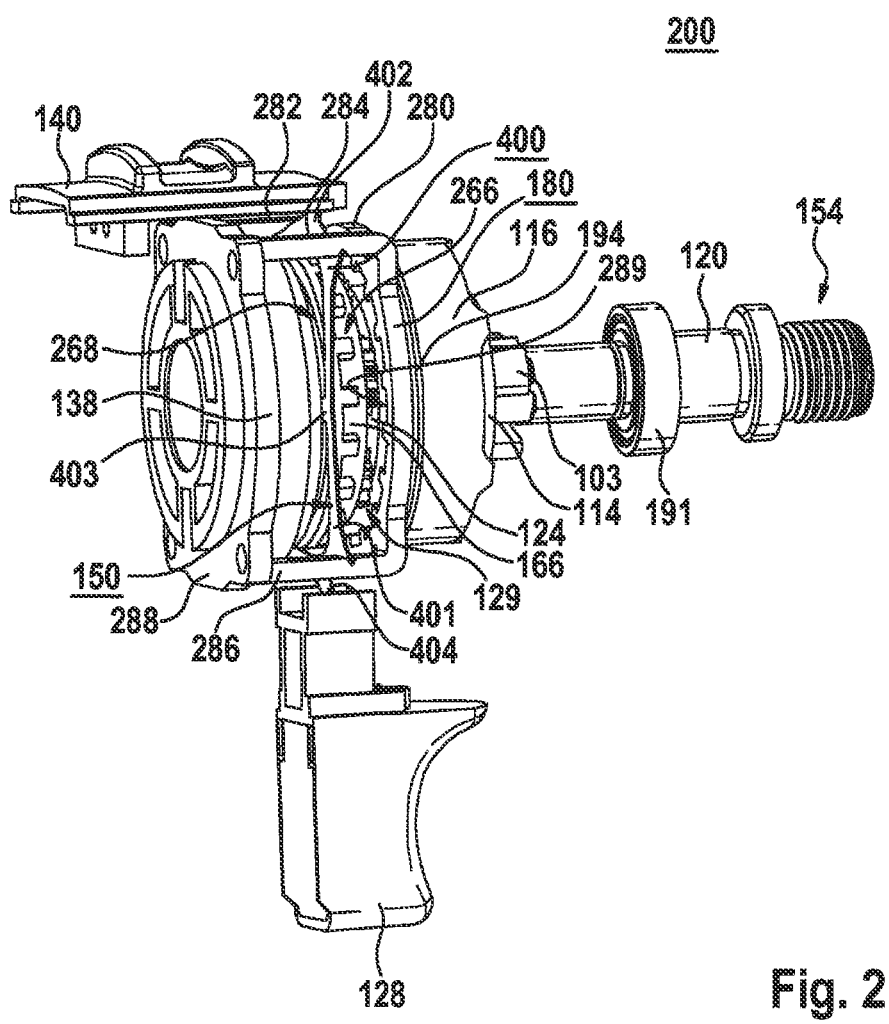
FIG. 2 shows an enlarged perspective view of a detail of the hand-held power tool from FIG. 1.

FIG. 2 shows a system 200 which includes planetary gear 118, drive shaft 120, hand switch 128, and slide switch 140 from FIG. 1 for illustrating an example of one embodiment of shifting annulus gear 166, bearing element 180, and bistable spring element 400 from FIG. 1. In system 200, as an example, annulus gear 138 of rear planetary stage 172 from FIG. 1 is designed, at least in sections, in the manner of a blind flange for closing off planetary gear 118 on the motor side.

Shifting annulus gear 166 preferably has at least one annular groove 268 on its outer periphery. In addition, at least one first locking geometry 266 is preferably formed on the outer periphery of the shifting annulus gear.

Bearing element 180 preferably includes a ring-shaped support 280 on which, according to one specific embodiment, at least two and preferably four axial bearing arms 282, 284, 286, 288 are provided which, starting from ring-shaped support 280, extend in the axial direction at a predefined radial distance across shifting annulus gear 166 in the direction of annulus gear 138. In addition, a second locking geometry 289 is preferably formed on ring-shaped support 280, and in the first gear of hand-held power tool 100 engages with first locking geometry 266 provided on the outer periphery of shifting annulus gear 166 in order to connect shifting annulus gear 166 to bearing element 180 in a rotatably fixed manner, as described for FIG. 1. Bearing arms 282, 284, 286, 288 are preferably designed for pivotably supporting bistable spring element 400, as described below for FIG. 5.

According to one specific embodiment, bistable spring element 400 includes a ring-shaped base body 401 which completely encloses shifting annulus gear 166 and which is thus situated in the area between shifting member 166 and gear housing 190 from FIG. 1, as is apparent from viewing FIGS. 1 and 2. Base body 401 is designed as a ring- or annular-shaped leaf spring as an example. Base body 401 may be formed from a punched sheet metal part, for example. In addition, bistable spring element 400 includes at least one and preferably two cam latches 403 (and 405 in FIG. 4) which are radially inwardly directed, starting from ring-shaped base body 401. These cam latches are coupled to shifting annulus gear 166, and are designed for moving annulus gear 166 into the first shift position associated with the second gear or into the second shift position associated with the first gear, as described for FIG. 1, when bistable spring element 400 is actuated for the gear shifting. As illustrated, radially inwardly directed cam latches 403 (and 405 in FIG. 4) engage with annular groove 268 provided on the outer periphery of shifting annulus gear 166.

In addition, according to one specific embodiment, at least one and preferably two control latches 402, 404 which are radially outwardly directed, starting from ring-shaped base body 401, is/are provided on bistable spring element 400. As illustrated, these control latches are oriented at least approximately at a right angle to cam latches 403 (and 405 in FIG. 4), and are designed for allowing an actuation of bistable spring element 400 for the gear shifting, at least via hand switch 128 and/or slide switch 140.

Figure 3:
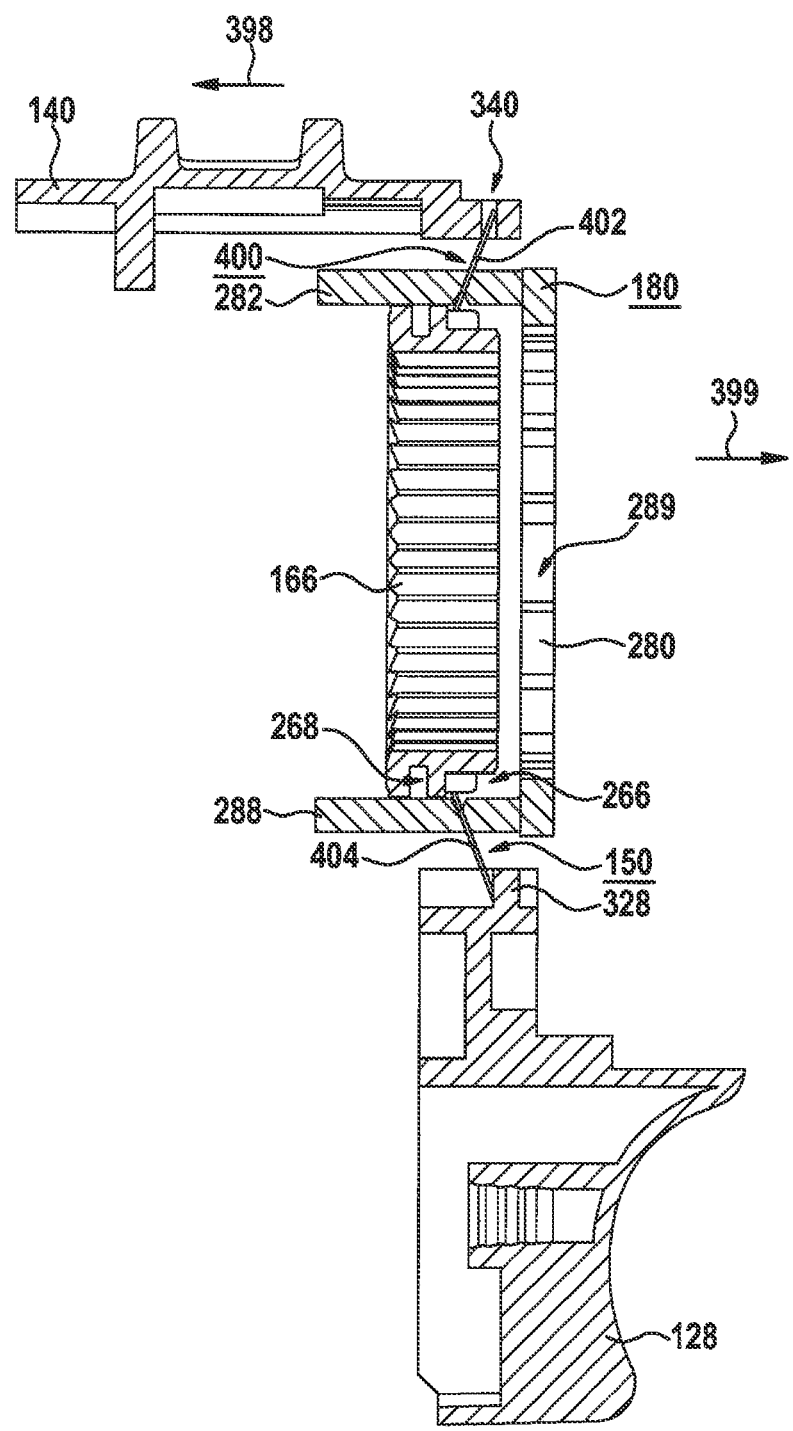
FIG. 3 shows a sectional view of a portion of the detail from FIG. 2.

FIG. 3 shows hand switch 128, slide switch 140, shifting annulus gear 166, bearing element 180, and bistable spring element 400 from FIGS. 1 and 2 for illustrating an example of gear shifting from the second gear into the first gear of hand-held power tool 100 from FIG. 1. FIG. 3 depicts an example of fixing of a first control latch 402 of bistable spring element 400 in groove-shaped receptacle 340 of slide switch 140, and an example of a second control latch 404 of bistable spring element 400 resting against a web-shaped control member 328 of hand switch 128. Preferably only these two control latches 402, 404 pass radially outwardly through gear housing 190 from FIG. 1.

According to one specific embodiment, during operation of hand-held power tool 100 from FIG. 1, either hand switch 128 or slide switch 140 is pressed or shifted in the direction of an arrow 398 for the gear shifting from the second gear into the first gear. Control latch 402 or control latch 404 is thus likewise shifted in the direction of arrow 398, thus causing pivoting of bistable spring element 400 on bearing element 180. Bistable spring element 400, starting from a first stable shift position associated with the second gear, is thus initially transferred into its unstable or metastable position in the direction of an arrow 399, from which, when an associated switch point is exceeded, it jumps into its second stable shift position associated with the first gear, in the manner of a so-called "clicker," in the direction of arrow 399.

Figure 4:
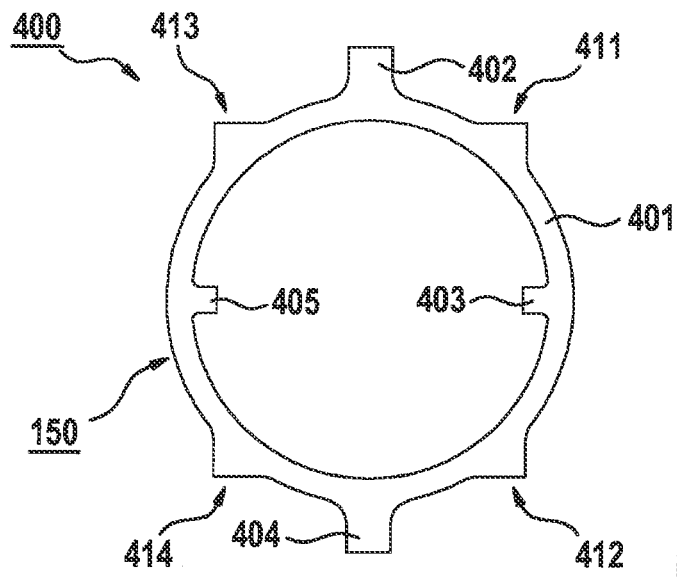
FIG. 4 shows a top view onto the bistable spring element from FIGS. 1 through 3.

FIG. 4 shows bistable spring element 400 from FIGS. 1 through 3 together with ring-shaped base body 401 for illustrating radially outwardly directed control latches 402, 404 and radially inwardly directed cam latches 403, 405, which are preferably oriented at approximately a right angle to the outwardly directed control latches. In addition, FIG. 4 shows an example of body edges 411, 412, 413, 414 of bistable spring element 400, which are preferably designed as radial extensions on ring-shaped base body 401 and are preferably oriented at least approximately in parallel to radially inwardly directed cam latches 403, 405.

Figure 5:
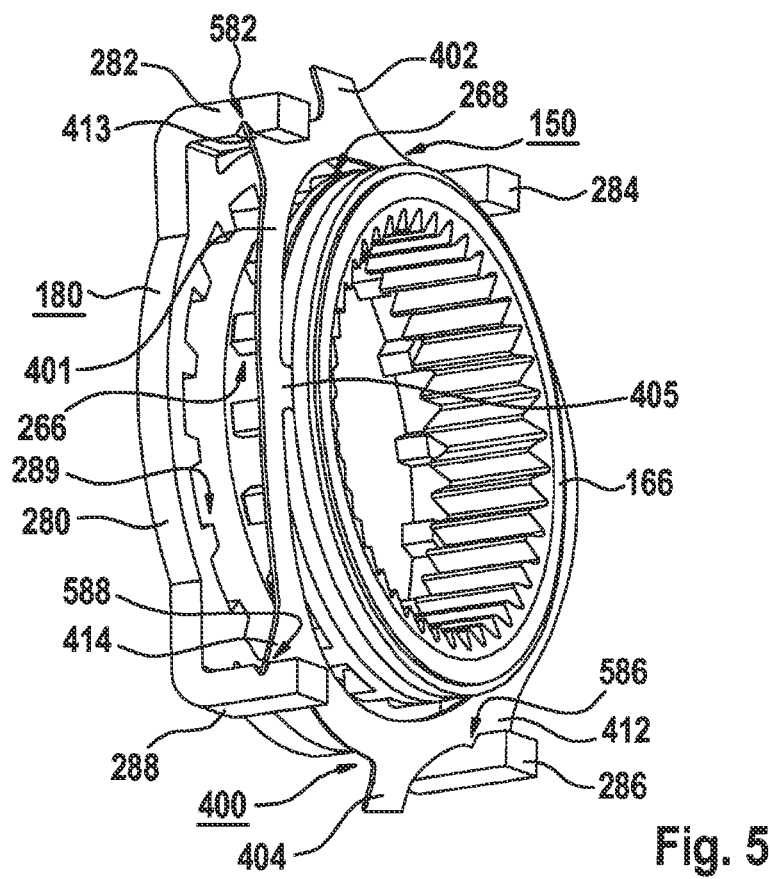
FIG. 5 shows a perspective view of a portion of the detail from FIG. 2, viewed from a viewing angle which is different from that in FIG. 2.

FIG. 5 shows shifting annulus gear 166 and bearing element 180 from FIGS. 1 through 3 and bistable spring element 400 from FIGS. 1 through 4 for illustrating a preferred pivotable bearing of spring element 400 on bearing element 180 or in gear housing 190 from FIG. 1. According to one specific embodiment, bistable spring element 400 is supported on bearing arms 282, 284, 286, 288 of bearing element 180 on at least two, and as illustrated, on its four, body edges 412, 413, 414 (and 411 from FIG. 4), which are designed as radial extensions on ring-shaped base body 401 of bistable spring element 400.

In the illustration, preferably V-shaped associated bearing grooves are formed on bearing arms 282, 284, 286, 288, with which preferably flat body edges 412, 413, 414 (and 411 from FIG. 4) engage. For example, body edge 412 engages with a bearing groove 586 provided on bearing arm 286, body edge 413 engages with a bearing groove 582 provided on bearing arm 282, and body edge 414 engages with a bearing groove 588 provided on bearing arm 288.

As an example, body edges 412, 414 form a first pivot bearing axis, and body edges 413 (and 411 from FIG. 4) forma second pivot bearing axis, radially inwardly directed cam latches 405 (and 403 from FIG. 4) preferably being situated in the area between these two pivot bearing axes.

Figure 6:
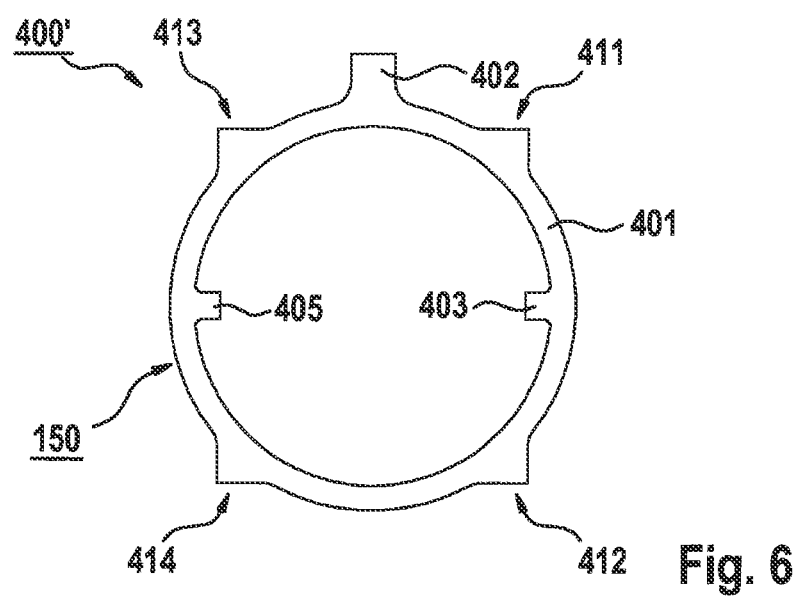
FIG. 6 shows a top view onto one alternative embodiment of the bistable spring element.

According to one alternative specific embodiment shown in FIG. 6, bistable spring element 400' includes a ring-shaped base body 401 which completely encloses shifting annulus gear 166 and which is thus situated in the area between shifting member 166 and gear housing 190 from FIG. 1, as is apparent from viewing FIGS. 1 and 2. Bistable spring element 400' according to FIG. 6 differs from bistable spring element 400 shown in FIG. 4 in that only radially outwardly directed control latch 402, starting from ring-shaped base body 401, is provided. Control latch 402 is designed for allowing an actuation of bistable spring element 400' for the gear shifting at least via slide switch 140.

Figure 7:
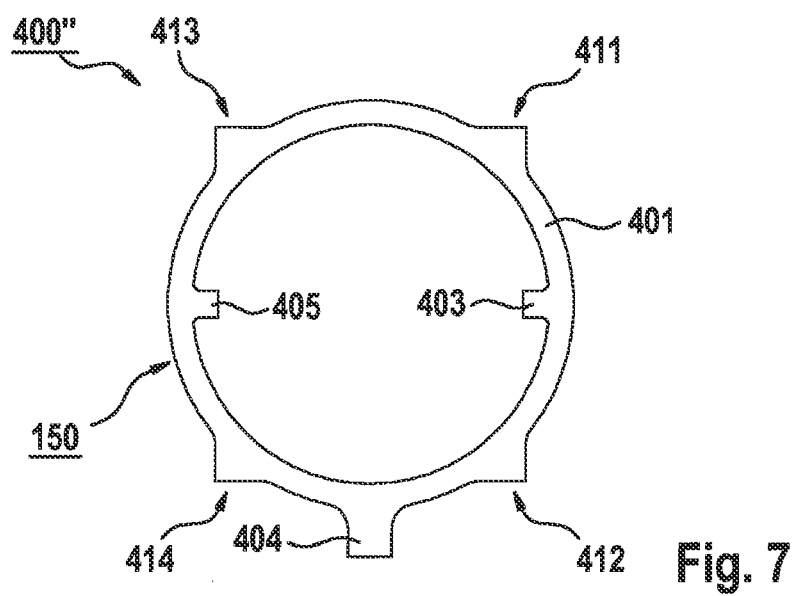
FIG. 7 shows a top view onto another alternative embodiment of the bistable spring element.

According to one alternative specific embodiment shown in FIG. 7, bistable spring element 400" includes a ring-shaped base body 401 which completely encloses shifting annulus gear 166 and which is thus situated in the area between shifting member 166 and gear housing 190 from FIG. 1, as is apparent from viewing FIGS. 1 and 2. Bistable spring element 400" according to FIG. 7 differs from bistable spring element 400 shown in FIG. 4 in that only radially outwardly directed control latch 404, starting from ring-shaped base body 401, is provided. Control latch 404 is designed for allowing an actuation of bistable spring element 400' for the gear shifting at least via hand switch 128.

Figure 8:
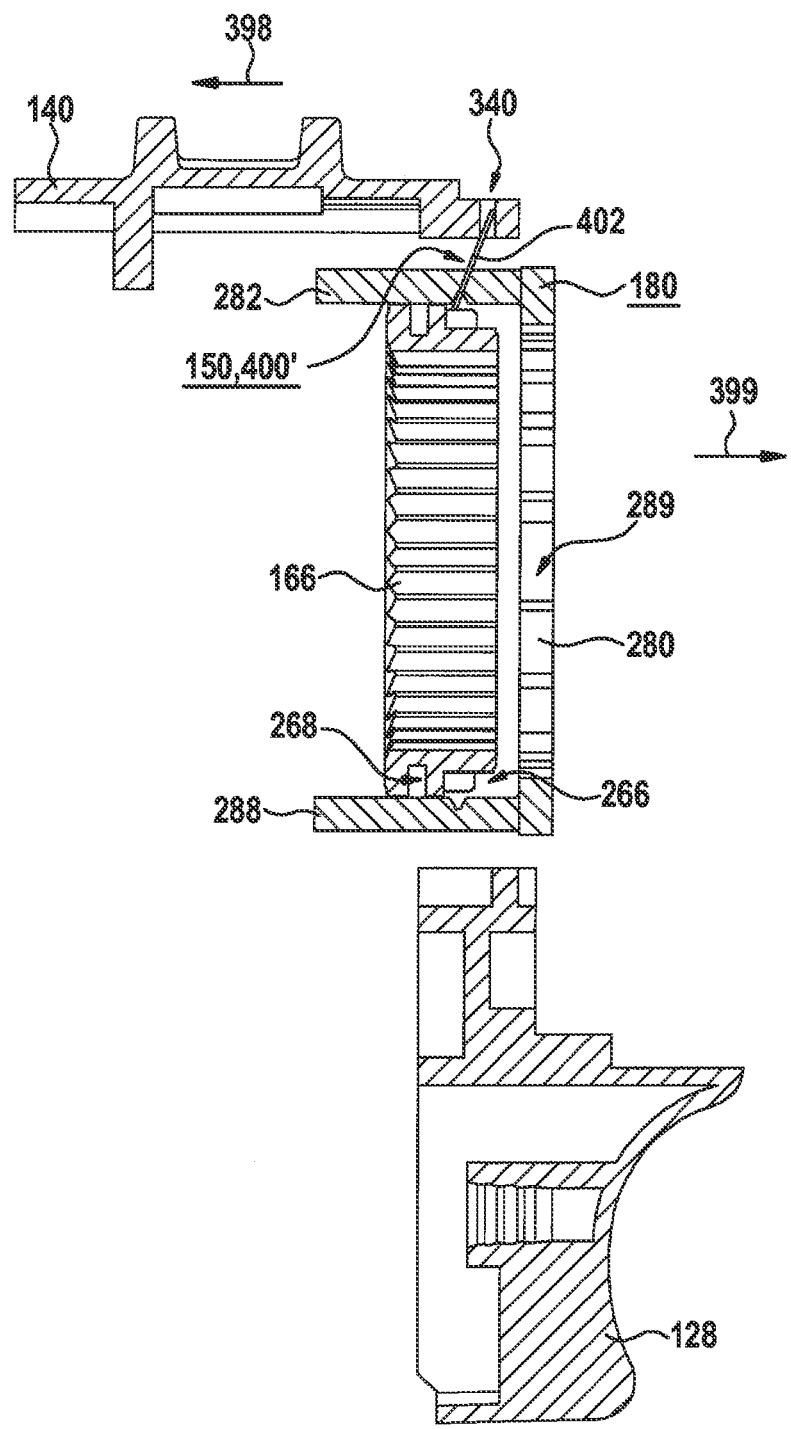
FIG. 8 shows a sectional view analogous to FIG. 3 together with the bistable spring element according to FIG. 6.

By analogy to FIG. 3, FIG. 8 shows hand switch 128, slide switch 140, shifting annulus gear 166, bearing element 180, and the bistable spring element 400' in the alternative embodiment according to FIG. 6. FIG. 8 depicts an example of fixing of a control latch 402 of bistable spring element 400' in groove-shaped receptacle 340 in slide switch 140. Bistable spring element 400' is not coupled to hand switch 128. According to this specific embodiment, during operation of hand-held power tool 100 from FIG. 1, slide switch 140 is pressed or shifted in the direction of an arrow 398 for the gear shifting from the second gear into the first gear. Control latch 402 is thus likewise moved in the direction of arrow 398, thus causing pivoting of bistable spring element 400' on bearing element 180. Bistable spring element 400', starting from a first stable shift position associated with the second gear, is thus initially transferred into its unstable or metastable position in the direction of an arrow 399, from which, when an associated switch point is exceeded, it jumps into its second stable shift position associated with the first gear, in the manner of a so-called "clicker," in the direction of arrow 399.

Figure 9:
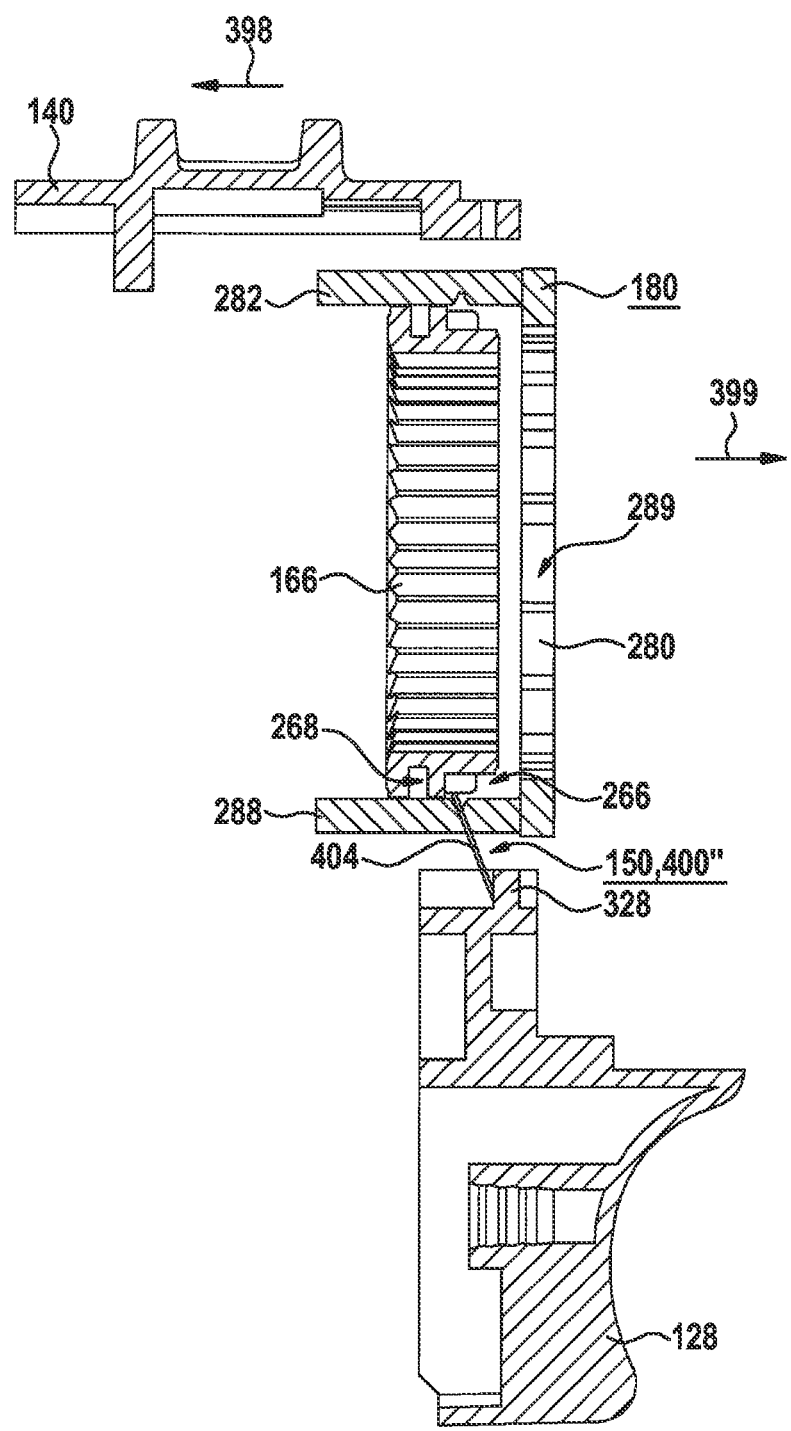
FIG. 9 shows a sectional view analogous to FIG. 3 together with the bistable spring element according to FIG. 7.

By analogy to FIG. 3, FIG. 9 shows hand switch 128, slide switch 140, shifting annulus gear 166, bearing element 180, and bistable spring element 400" in the alternative embodiment according to FIG. 7. FIG. 9 depicts an example of control latch 404 of bistable spring element 400" resting against web-shaped control member 328 of hand switch 128. Bistable spring element 400" is not coupled to slide switch 140. According to this specific embodiment, during operation of hand-held power tool 100 from FIG. 1, hand switch 128 is pressed or shifted in the direction of an arrow 398 for the gear shifting from the second gear into the first gear. Control latch 404 is thus likewise moved in the direction of arrow 398, thus causing pivoting of bistable spring element 400" on bearing element 180. Bistable spring element 400", starting from a first stable shift position associated with the second gear, is thus initially transferred into its unstable or metastable position in the direction of an arrow 399, from which, when an associated switch point is exceeded, it jumps into its second stable shift position associated with the first gear, in the manner of a so-called "clicker," in the direction of arrow 399.

Figure 10:
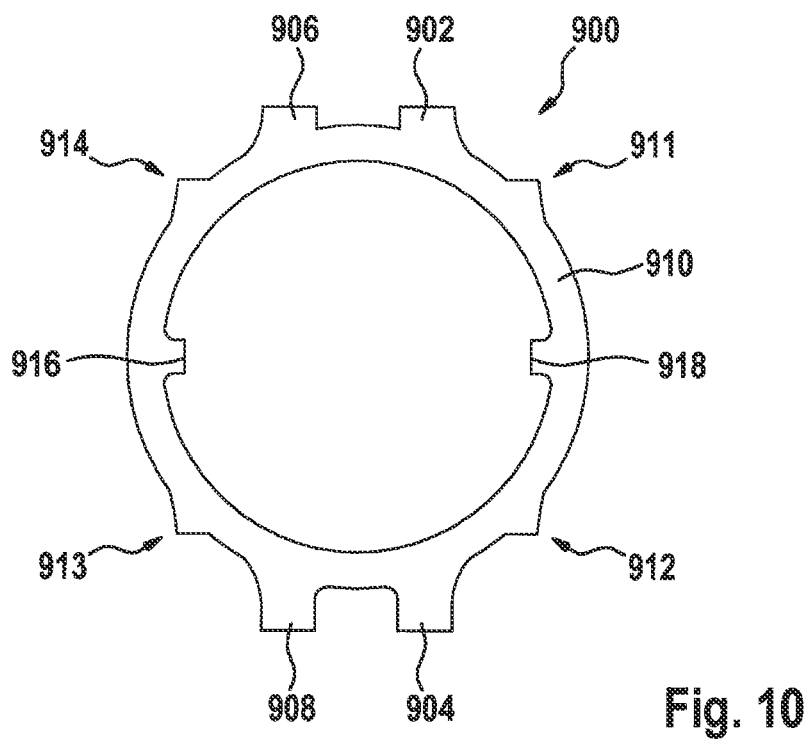
FIG. 10 shows a top view onto another alternative embodiment of the bistable spring element.

FIG. 10 shows another alternative specific embodiment of bistable spring element 900. Bistable spring element 900 represents an alternative design of bistable spring element 400 shown in FIG. 4. This bistable spring element 900 preferably includes a total of four control latches: two upper control latches 902, 906 and two lower control latches 904, 908. These control latches are preferably integrally formed on an essentially ring- or annular-shaped base body 910 of bistable spring element 900. Base body 910 may also have other shapes, and may be polygonal, for example. The two upper control latches 902, 906 and the two lower control latches 904, 908 are preferably integrally formed in pairs in each case, at least approximately diametrically opposite one another and directed radially outwardly, on base body 910, preferably designed as a punched sheet metal part. Base body 910 is designed as a ring- or annular-shaped leaf spring as an example.

By analogy to bistable spring element 400 according to FIG. 4, bistable spring element 900 preferably has in each case one, and thus in the illustration a total of four, radially outwardly directed body edges 911 through 914 having an approximately triangular outer contour in each quadrant of base body 910. With the aid of body edges 911 through 914, spring element 900 is preferably supported so that it is pivotable relative to a component fixed to the housing. Likewise by analogy to bistable spring element 400 according to FIG. 4, bistable spring element 900 preferably includes two cam latches 916, 918 which are radially inwardly directed, starting from ring-shaped base body 910, and which are preferably integrally formed on base body 910.

Figure 11:
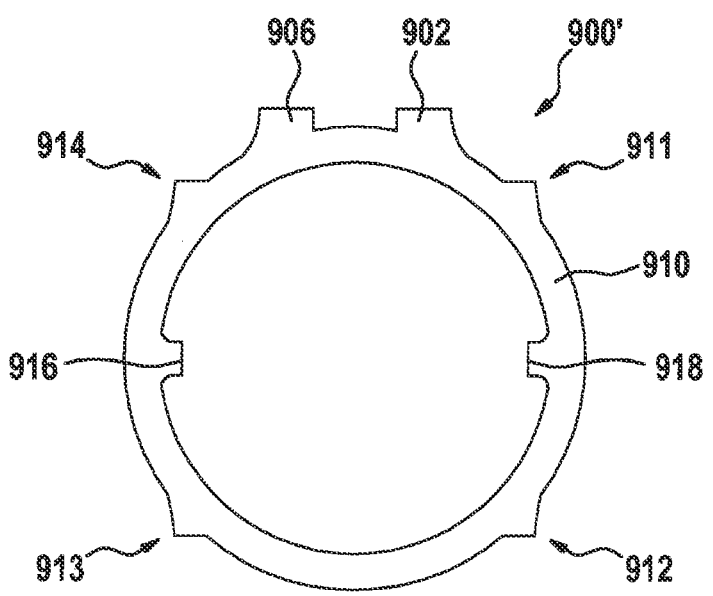
FIG. 11 shows a top view onto another alternative embodiment of the bistable spring element.

Bistable spring element 900' in the alternative specific embodiment according to FIG. 11 differs from bistable spring element 900 shown in FIG. 10 in that only the two upper, radially outwardly directed control latches 902, 906, starting from ring-shaped base body 910, are provided. Control latches 902, 906 are designed for allowing an actuation of bistable spring element 900' for the gear shifting at least via slide switch 140.

Figure 12:
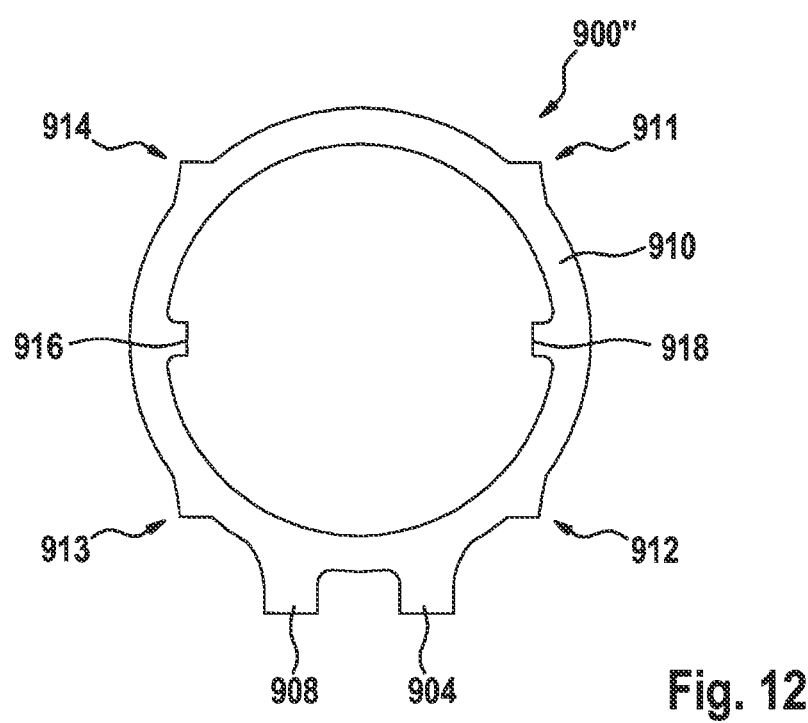
FIG. 12 shows a top view onto another alternative embodiment of the bistable spring element.

Bistable spring element 900" in the alternative specific embodiment according to FIG. 12 differs from bistable spring element 900 shown in FIG. 10 in that only the two lower, radially outwardly directed control latches 904, 908, starting from ring-shaped base body 910, are provided. Control latches 904, 908 are designed for allowing an actuation of bistable spring element 900" for the gear shifting at least via hand switch 128.

Figure 13:
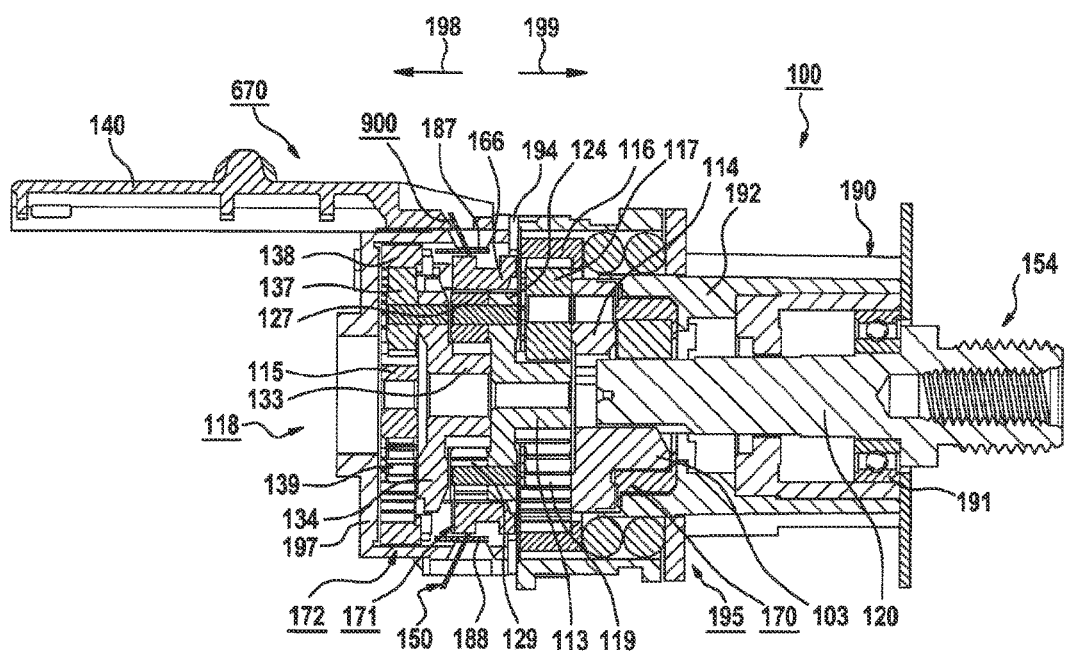
FIG. 13 shows a detail of the hand-held power tool from FIG. 1 together with the drive shaft and the planetary gear driven by an associated drive motor, the planetary gear having a design here according to one alternative specific embodiment as an example.

FIG. 13 shows a detail of the hand-held power tool from FIG. 1 together with drive shaft and planetary gear, which is driven by an associated drive motor and designed here according to one alternative specific embodiment as an example. As described for FIG. 1, planetary gear 118 is designed in the manner of a reduction gear unit which includes at least one shiftable gear stage. As illustrated, planetary gear 118 is designed with three planetary stages, i.e., front stage 170, middle stage 171, and rear stage 172, situated in gear housing 190.

Front planetary stage 170 is preferably fixed in a front housing section 192 of gear housing 190 via a retaining plate 194, and as an example includes a sun wheel 113, at least first and second planet wheel 117 and 119, a planet carrier 114, and annulus gear 116, which is situated in gear housing 190 in an axially immovable and rotatably fixed manner in the drilling position. Planet carrier 114 is connected to a drive member 103 of drive shaft 120, which together with drive shaft 120 establishes at least a form-fit connection, for example; drive member 103 may be suitably fastened to planet carrier 114 or may be integrally molded onto same or formed in one piece with same.

Middle planetary stage 171 includes, as an example, a sun wheel 133, at least first planet wheel and second planet wheel 127 and 129, a planet carrier 124, and shifting member 166, which according to one specific embodiment is designed in the manner of a one-piece shifting annulus gear and is also referred to below as "shifting annulus gear." Alternatively, the shifting member may have a two-piece or two-part design, and may include, for example, an axially immovable inner annulus gear and an axially movable outer shift sleeve. Planet carrier 124 forms sun wheel 113 of front planetary stage 170; sun wheel 113 may be suitably fastened to planet carrier 124, or may be integrally molded onto same or formed in one piece with same.

Rear planetary stage 172 includes, as an example, at least first planet wheel and second planet wheel 137 and 139, planet carrier 134, and annulus gear 138, which is situated in gear housing 190 in an axially immovable and rotatably fixed manner. During operation of hand-held power tool 100, planet wheels 137, 139 are driven by a sun wheel 115, only schematically indicated, which is formed, for example, by a pinion associated with the drive motor. Planet carrier 134 forms sun wheel 133 of middle planetary stage 171; sun wheel 133 may be suitably fastened to planet carrier 134 or may be integrally molded onto same or formed in one piece with same.

During operation of hand-held power tool 100, shifting annulus gear 166 is displaceable in the axial direction of gear housing 190 from a front shift position, shown in FIG. 13, in the direction of an arrow 198 into a rear shift position, not shown, by actuating bistable spring element 900, for example with the aid of shifting element 140 or with the aid of hand switch 128. In planetary gear 118 from FIG. 13 designed according to the alternative specific embodiment, in contrast to planetary gear 118 designed according to the specific embodiment described for FIG. 1, the front shift position is associated with the second, comparatively fast gear of planetary gear 118 having low torque, and the rear shift position is associated with the first, comparatively slow gear of planetary gear 118 having high torque. By a reversed displacement of shifting annulus gear 166 from its rear shift position into its front shift position, as indicated by an arrow 199, planetary gear 118 may then be shifted back from the first gear into the second gear.

In its front shift position, shifting annulus gear 166 is connected in a rotatably fixed manner to planet carrier 124 of middle planetary stage 171, so that this planet carrier 124 and planet wheels 127, 129 of middle planetary stage 171 are likewise connected to one another in a rotatably fixed manner. Middle planetary stage 171 is thus deactivated, so that the second gear is activated. In its rear shift position, shifting annulus gear 166 is connected to annulus gear 138 of rear planetary stage 172 and thus to gear housing 190 in a rotatably fixed manner, so that middle planetary stage 171 and thus the first gear are activated. The shift positions of shifting annulus gear 166 and thus of shiftable transmission 118 correspond in each case to an associated gear shift position of second shifting element 140, which is preferably designed as a slide switch, and which in addition to its primary gear shifting function may also have at least one operating mode switching function.

Figure 14:
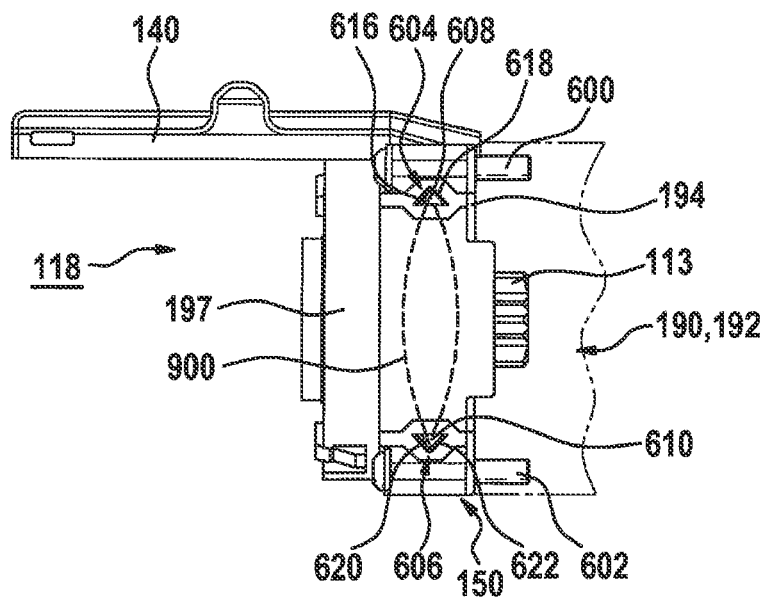
FIG. 14 shows a perspective top view onto a housing section of the gear housing of the planetary gear from FIG. 13.

FIG. 14 shows rear housing section 197 of planetary gear 118 from FIG. 13, in which sun wheel 113 and actuating element 150, designed as bistable spring element 900, are accommodated, the bistable spring element, the same as described for FIG. 6, being controllable with the aid of second shifting element 140, preferably designed as a slide switch, and shifting element 128 from FIG. 1, designed as an acceleration switch. The fastening of housing section 197 to gear housing 190, indicated by a dotted line, or to front housing section 192 thereof preferably takes place with the aid of at least one, and in the illustration four, fastening elements, of which only fastening elements 600, 602 are illustrated here. These may be designed, for example, as threaded bolts, rivets, or the like.

According to one specific embodiment, bistable spring element 900, which is preferably mechanically pretensioned in the axial direction of planetary gear 118 and thus arched, is clamped between at least two and preferably four bearing grooves which are V-shaped in each case, of which only the two V-shaped bearing grooves 604, 606 on the front side are visible here. Bearing grooves 604, 606 preferably pass through housing section 197 of gear housing 190, and thus preferably form in each case triangular lateral openings in rear housing section 197, of which only the two openings 608, 610 on the front side are visible here. Openings 608, 610 of V-shaped bearing grooves 604, 606 preferably face one another.

Bearing grooves 604, 606 and triangular openings 608, 610 allow a particularly smooth bearing and movement of bistable spring element 900 in its provided deflection range, so that the change between the two stable states of spring element 900 takes place fluidly and with a consistently reproducible actuating force. Both possible stable (shifting) states or shift positions of bistable spring element 900 are indicated in each case by a curved dashed line in FIG. 14. Bearing grooves 604, 606 and openings 608, 610 in each case have oppositely facing V-shaped inclined walls 616, 618 and 620, 622, respectively, against which spring element 900, at least in areas, rests in alternation in its two stable shift positions. The same applies for the V-shaped bearing grooves and triangular openings on the rear side, not illustrated here.

Figure 15:
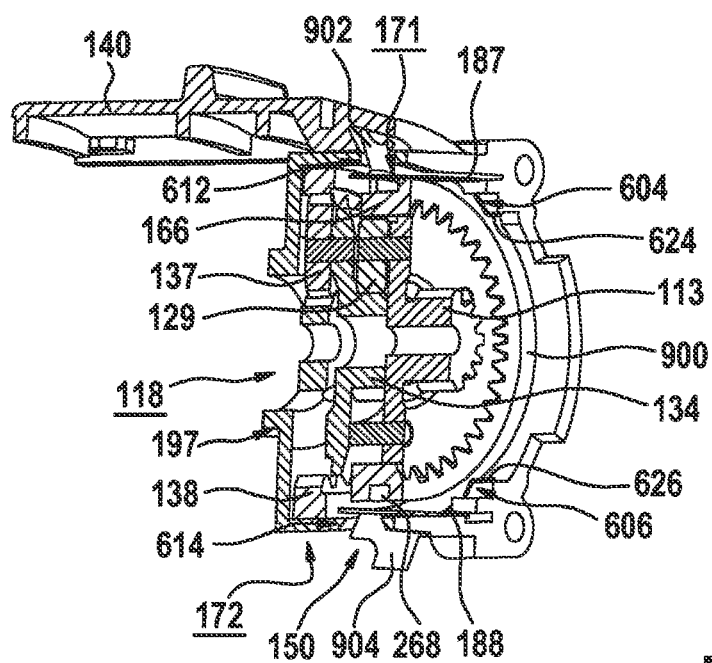
FIG. 15 shows a longitudinal section of the housing section of the gear housing from FIG. 14.

FIG. 15 shows rear housing section 197 from FIGS. 13 and 14, in which rear stage 172 of planetary gear 118 together with planet wheel 137, situated on planet carrier 134, and associated annulus gear 138 are accommodated. In addition, middle stage 171 of planetary gear 118, together with shifting member 166, designed as a shifting annulus gear, and associated planet wheel 129 are integrated into housing section 197.

Control latches 902, 904 preferably pass through associated sealing plates 187, 188 accommodated in rear housing section 197, and are guided on both the top side and bottom side by recesses 612, 614, respectively, or slits or gaps in housing section 197. Recesses 612, 614 each preferably have a trapezoidal cross-sectional geometry which expands radially outwardly, and whose walls are in each case inclined with respect to one another.

For reducing wear, rear housing section 197 of planetary gear 118 is preferably filled, at least in areas, with a low-viscosity lubricant, in particular grease. Sealing plates 187, 188 on the one hand prevent grease from escaping, and on the other hand simplify the mounting of planetary gear 118, since opening geometries of recesses 612, 614 may have larger dimensions due to being subsequently covered by sealing plates 187, 188, thus simplifying the installation of spring element 900 and the assembly of planetary gear 118.

A metallic flashing 624, 626 is preferably situated in each case in the two V-shaped bearing grooves 604, 606 shown and in the two other concealed bearing grooves to prevent spring element 900 from "digging into" the material of rear housing section 197. This design has proven to be particularly advantageous when rear housing section 197 of planetary gear 118 is made of a plastic material, at least in areas. Flashings 624, 626, including the two additional flashings not illustrated here, each have an approximately V-shaped cross-sectional geometry which corresponds to the likewise V-shaped cross-sectional geometry of the bearing grooves and their associated triangular openings.

Figure 16:
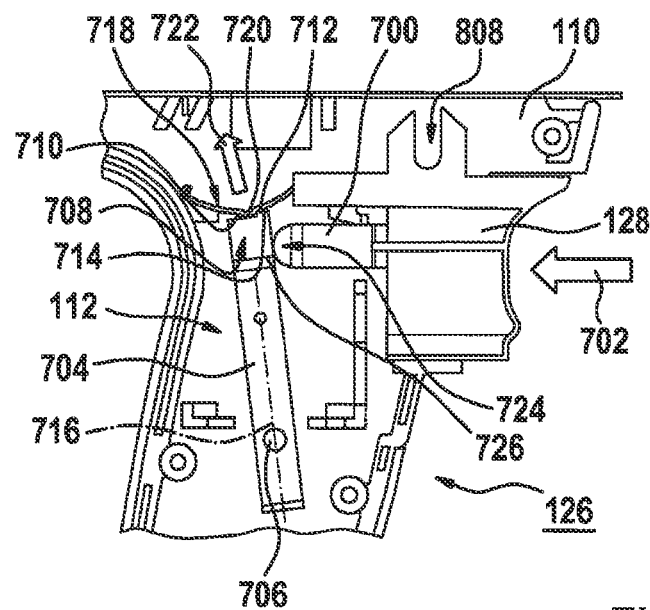
FIG. 16 shows a top view onto the first shifting element, designed as a hand switch, in a further embodiment.

FIG. 16 shows a detail of first shifting element 128 from FIG. 1, preferably designed as a hand switch, according to one specific embodiment in which the first shifting element includes a tappet 700 on the rear side which faces away from a front actuating surface, on the right in FIG. 16. The tappet is preferably designed in one piece with shifting element 128, which is preferably made in one piece from a plastic material.

When shifting element 128, starting from the position illustrated here, is actuated by a user in the direction of an arrow 702 against the action of force of a compression spring, not illustrated here, of an (electronic) on/off switch, an approximately rectangular lever 704, which is pivotably supported on a journal 706 formed on rear housing shell 112, for example, in the area of handle 126 of tool housing 110, pivots in an angular range of up to 20°. Journal 706 is preferably vertical, and integrally formed on tool housing 110 or a housing shell 112 thereof.

On its end facing away from journal 706, lever 704 preferably includes a contact contour 708 with a first section 710, which via a step 712 merges into a second section 714 which is shorter than first section 710. Sections 710, 714 of contact contour 708 extend approximately in parallel. The two sections 710, 714 and step 712 extend across the entire width of lever 704, sections 710, 714 extending approximately at a right angle to a longitudinal center axis 716 of lever 704, and step 712 preferably being oriented at an angle with respect to longitudinal center axis 716 which differs slightly from 0°.

A spring member 718 which likewise is suitably fastened in housing shell 112 is implemented here, as an example, with an arched leaf spring, in the middle of which an elevation 720 which is preferably at least approximately semicircular, and which in the shown position of lever 704 rests against section 710 with a preferably comparatively small mechanical pretension, and also against the side of step 712. When first shifting element 128, starting from the position illustrated here, is actuated further in the direction of arrow 702, step 712 of contact contour 708, after the predefined actuating force is exceeded, moves past elevation 720 and thus presses spring member 718 in the direction of an arrow 722, i.e., vertically in a direction facing away from journal 706, elevation 720 then sliding along farther on second section 714 of contact contour 708. In addition, a parallel offset 726 is formed in the area of a contact zone 724 in lever 704 having a preferably rectangular cross-sectional geometry, as the result of which contact contour 708 extends at a small distance from housing shell 112, situated thereunder, when lever 704 pivots. Shortly before the bistable spring element (see FIGS. 13 through 15) changes from the one stable shift position into the other stable shift position, spring member 718, in particular for increasing the operational reliability and ease of use, thus allows feedback which is clearly haptically and/or acoustically perceivable to the user when first shifting element 128 has covered a specified distance in the direction of arrow 702 or has been pressed in far enough by the user.

In hand-held power tool 100 according to FIG. 1 and in the alternative specific embodiment according to FIG. 13, for the purpose of simplifying the drawing, bistable spring element 400 according to FIG. 4 and bistable spring element 900 according to FIG. 10 are illustrated with control latches for controlling the spring element by the first shifting element, in particular hand switch 128, and also with control latches for control by the second shifting element, in particular slide switch 140. Alternatively, bistable spring element 400 may also be used in the shiftable planetary gear according to FIG. 13, while bistable spring element 900 may be used in hand-held power tool 100 according to FIG. 1. In a hand-held power tool in which bistable spring element 400″ according to FIG. 7 or bistable spring element 900″ according to FIG. 12 is used, the gear shifting takes place solely via the first shifting element, i.e., hand switch 128. In such a specific embodiment of hand-held power tool 100, a second shifting element in the form of a separate slide switch 140 is not necessary for the gear shifting. Hand switch 128 meets both functions, namely, switching on/off or the acceleration function, and the gear shifting of hand-held power tool 100. In a hand-held power tool in which bistable spring element 400′ according to FIG. 6 or bistable spring element 900′ according to FIG. 11 is used, the gear shifting takes place solely via the second shifting element, i.e., slide switch 140. In such a specific embodiment of hand-held power tool 100, hand switch 128 is used solely as an on/off switch or an acceleration switch. Hand switch 128 has no additional function as a gear shifting element.

What is claimed is:

1. A hand-held power tool, comprising:
a shiftable transmission for driving a drive shaft, wherein the shiftable transmission is situated in a gear housing and is shiftable at least between a first gear and a second gear via a shifting member; and
a pivotably supported actuating element associated with the shifting member, wherein the pivotably supported actuating element is configured as a bistable spring element and is situated, at least in sections, in an area between the shifting member and the gear housing, the bistable spring element being actuatable for the gear shifting, and wherein the bistable spring element assumes a stable shift position in at least one shift position of the shifting member associated with one of the first gear or the second gear, and assumes an unstable position in an intermediate position of the shifting member which is situated between shift positions of the shifting member associated with the first and second gears,
wherein the bistable spring element is pivotably supported on a bearing element comprising a ring shaped support.

2. The hand-held power tool as recited in claim 1, wherein the bistable spring element includes a ring-shaped base body which is situated in the area between the shifting member and the gear housing.

3. The hand-held power tool as recited in claim 1, wherein the bistable spring element includes at least two radially inwardly directed cam latches which are (i) coupled to the shifting member, and (ii) configured for moving the shifting member into a selected shift position which is associated with one of the first gear or the second gear when the bistable spring element is actuated for the gear shifting.

4. The hand-held power tool as recited in claim 1, wherein the bistable spring element includes at least two radially outwardly directed control latches which are configured for allowing an actuation of the bistable spring element for the gear shifting via one of a first shifting element or a second shifting element.

5. The hand-held power tool as recited in claim 4, wherein the bistable spring element includes at least four radially outwardly directed control latches which are configured for allowing an actuation of the bistable spring element for the gear shifting via one of a first shifting element or a second shifting element.

6. The hand-held power tool as recited in claim 4, wherein the first shifting element is configured for providing an acceleration function, and the second shifting element is configured for providing a gear shifting function.

7. The hand-held power tool as recited in claim 3, wherein the bistable spring element includes at least one radially outwardly directed control latch which is configured for allowing an actuation of the bistable spring element for the gear shifting via at least one shifting element configured as a gear shift selector element.

8. The hand-held power tool as recited in claim 7, wherein the bistable spring element includes at least two radially outwardly directed control latches which are configured for allowing an actuation of the bistable spring element for the gear shifting via the at least one shifting element configured as the gear shift selector element.

9. The hand-held power tool as recited in claim 3, wherein the bistable spring element includes at least one radially outwardly directed control latch which is configured for allowing an actuation of the bistable spring element for the gear shifting via at least one shifting element configured as a hand switch.

10. The hand-held power tool as recited in claim 9, wherein the bistable spring element includes at least two radially outwardly directed control latches which are configured for allowing an actuation of the bistable spring element for the gear shifting via the at least one shifting element configured as the hand switch.

11. The hand-held power tool as recited in claim 3, wherein the bistable spring element is pivotably supported in the gear housing on at least two body edges.

12. The hand-held power tool as recited in claim 11, wherein the at least two body edges are configured as radial extensions on the ring-shaped base body of the bistable spring element.

13. The hand-held power tool as recited in claim 3, wherein a bearing element configured as a bearing plate for pivotably supporting the bistable spring element is situated in the gear housing.

14. The hand-held power tool as recited in claim 13, wherein at least two axial bearing arms for pivotably supporting the bistable spring element are formed on the bearing element.

15. The hand-held power tool as recited in claim 3, wherein the shiftable transmission is configured as a planetary gear which includes at least three planetary stages, and wherein the shifting member is configured as a shifting annulus gear.

16. A hand-held power tool, comprising:
a shiftable transmission for driving a drive shaft, wherein the shiftable transmission is situated in a gear housing and is shiftable at least between a first gear and a second gear via a shifting member; and
a pivotably supported actuating element associated with the shifting member, wherein the pivotably supported actuating element is configured as a bistable spring element and is situated, at least in sections, in an area between the shifting member and the gear housing, the bistable spring element being actuatable for the gear shifting, and wherein the bistable spring element assumes a stable shift position in at least one shift position of the shifting member associated with one of the first gear or the second gear, and assumes an unstable position in an intermediate position of the shifting member which is situated between shift positions of the shifting member associated with the first and second gears,
wherein the bistable spring element includes at least two radially inwardly directed cam latches which are (i) coupled to the shifting member, and (ii) configured for moving the shifting member into a selected shift position which is associated with one of the first gear or the second gear when the bistable spring element is actuated for the gear shifting,
wherein the bistable spring element includes at least one radially outwardly directed control latch which is configured for allowing an actuation of the bistable spring element for the gear shifting via at least one shifting element configured as a gear shift selector element,
wherein the bistable spring element includes at least two radially outwardly directed control latches which are configured for allowing an actuation of the bistable spring element for the gear shifting via the at least one shifting element configured as the gear shift selector element.

17. A hand-held power tool, comprising:
a shiftable transmission for driving a drive shaft, wherein the shiftable transmission is situated in a gear housing and is shiftable at least between a first gear and a second gear via a shifting member; and
a pivotably supported actuating element associated with the shifting member, wherein the pivotably supported actuating element is configured as a bistable spring element and is situated, at least in sections, in an area between the shifting member and the gear housing, the bistable spring element being actuatable for the gear shifting, and wherein the bistable spring element assumes a stable shift position in at least one shift position of the shifting member associated with one of the first gear or the second gear, and assumes an unstable position in an intermediate position of the shifting member which is situated between shift positions of the shifting member associated with the first and second gears,
wherein the bistable spring element includes at least two radially inwardly directed cam latches which are (i) coupled to the shifting member, and (ii) configured for moving the shifting member into a selected shift position which is associated with one of the first gear or the second gear when the bistable spring element is actuated for the gear shifting,
wherein the bistable spring element includes at least one radially outwardly directed control latch which is configured for allowing an actuation of the bistable spring element for the gear shifting via at least one shifting element configured as a hand switch,
wherein the bistable spring element includes at least two radially outwardly directed control latches which are configured for allowing an actuation of the bistable spring element for the gear shifting via the at least one shifting element configured as the hand switch.

18. A hand-held power tool, comprising:
a shiftable transmission for driving a drive shaft, wherein the shiftable transmission is situated in a gear housing and is shiftable at least between a first gear and a second gear via a shifting member; and
a pivotably supported actuating element associated with the shifting member, wherein the pivotably supported actuating element is configured as a bistable spring element and is situated, at least in sections, in an area between the shifting member and the gear housing, the bistable spring element being actuatable for the gear shifting, and wherein the bistable spring element assumes a stable shift position in at least one shift position of the shifting member associated with one of the first gear or the second gear, and assumes an unstable position in an intermediate position of the shifting member which is situated between shift positions of the shifting member associated with the first and second gears, wherein the bistable spring element is pivotably supported in the gear housing on at least four body edges, wherein at least two of the at least four body edges form a first pivot bearing axis and at least another two of the at least four body edges form a second pivot bearing axis.

19. The hand-held power tool as defined in claim 16, wherein the bistable spring element includes at least two radially inwardly directed cam latches which are (i) coupled to the shifting member, (ii) configured for moving the shifting member into a selected shift position which is associated with one of the first gear or the second gear when the bistable spring element is actuated for the gear shifting, and (iii) arranged between the first pivot bearing axis and the second pivot bearing axis.

\* \* \* \* \*